(No Model.) 2 Sheets—Sheet 2.
H. J. LA FORCE.
PNEUMATIC TIRE.
No. 537,536. Patented Apr. 16, 1895.
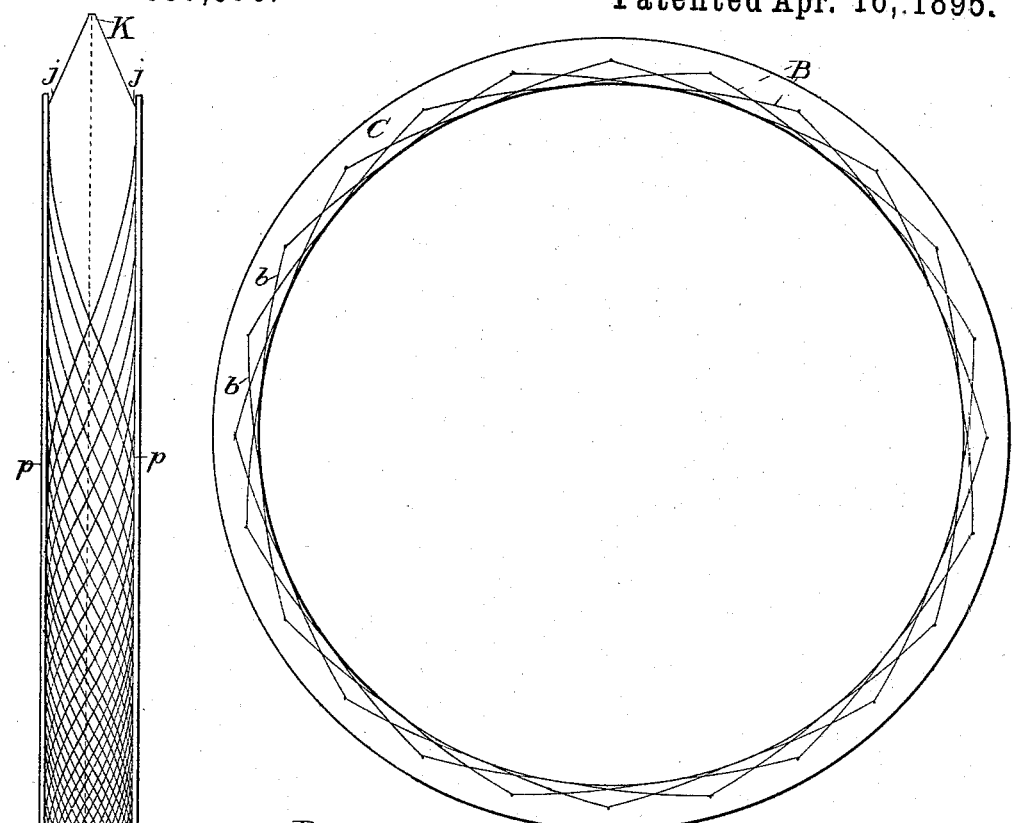
Fig. 7.
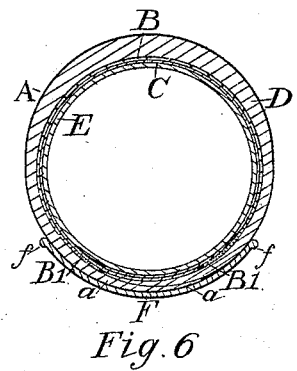
Fig. 6
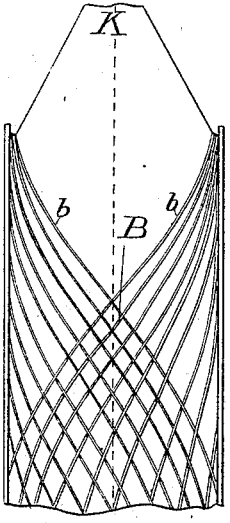
Fig. 5.
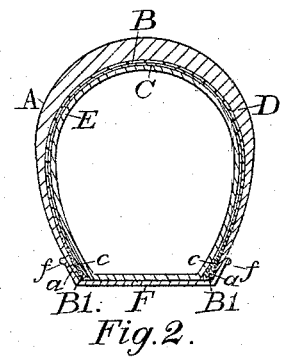
Fig. 2.
Fig. 4
Witnesses
John Pugsley
Wm. M. Cram
Inventor
H. J. La Force

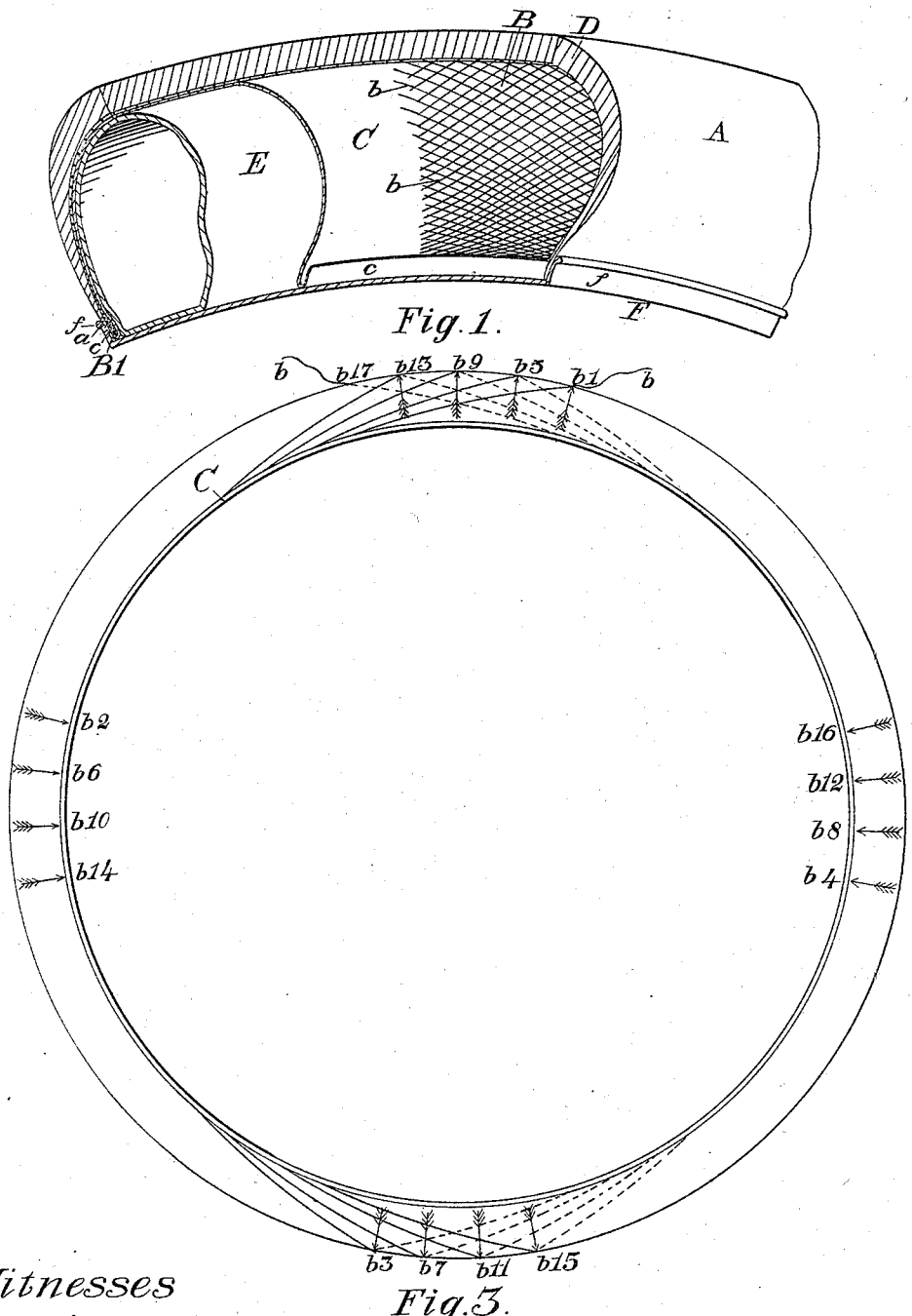

UNITED STATES PATENT OFFICE.

HIPPOLYTE J. LA FORCE, OF TORONTO, CANADA.

PNEUMATIC TIRE.

SPECIFICATION forming part of Letters Patent No. 537,536, dated April 16, 1895

Application filed December 23, 1893. Serial No. 494,609. (No model.) Patented in Canada February 16, 1894, No. 43,547; in Belgium February 28, 1894, No. 108,589, and in France May 10, 1894, No. 236,428.

*To all whom it may concern:*

Be it known that I, HIPPOLYTE JOSEPH LA FORCE, a subject of the Queen of Great Britain, residing in the city of Toronto, in the Province of Ontario, in the Dominion of Canada, have invented certain new and useful Improvements in Wheel-Tires, (for which I have obtained patents in France, No. 236,428, dated May 10, 1894; in Canada, No. 43,547, dated February 16, 1894, and in Belgium, No. 108,589, dated February 28, 1894,) of which the following is a specification, reference being had to the accompanying drawings, forming a part thereof.

My invention relates to wheel tires and is specially designed and adapted for a pneumatic tire, that is to say, a hollow tire which is filled out or distended by air, gas or other suitable substance.

The object of my invention is to provide a tire which may be simply and firmly secured to the rim of a wheel and which may be easily detached therefrom when desired.

In the drawings, Figure 1 is a perspective side elevational view of a section of a wheel tire and rim embodying my invention. To more clearly show the construction, the outer rubber cover appearing in the right hand quarter of this figure is shown as removed from one side of the second quarters. From the same side of the third quarter, the arrangement of bands is removed; and from the same side of the left hand quarter the inner lining is removed, leaving the inner inflatable core exposed to view. Fig. 2 is a vertical section of the same tire and rim as is shown in Fig. 1. Fig. 3 is a side elevation of a tire with a band or thread wound a few times over it to show the method of arranging the band shown in Figs. 1 and 2. Fig. 4 is a front elevation of a circular revolving form which may be used in winding the band or thread in the construction of the tire shown in Figs. 1 and 2. Fig. 5 shows an arrangement of the bands similar to that shown in Fig. 4 but with the bands or threads plaited. Fig. 6 is a vertical section of the same tire as shown in Fig. 2 but with the edges of the lining of the tire sheath meeting and overlapping on the rim. Fig. 7 is a side elevation of a modified form of my tire with the outer covering or thread of rubber removed.

A is the tire sheath.
B is the arrangement of bands or threads.
C is the inner lining of the tire sheath.
D is the outer cover of the tire sheath.
E is the inner inflatable core.
F is the wheel-rim or felly.

In Figs. 1 and 2 the tire sheath or cover is shown as composed of an arrangement "B" of longitudinal bands or threads, an inner lining "C" of canvas to which the arrangement "B" of bands or threads is cemented, and an outer cover "D" of rubber cemented or vulcanized to the inner lining "C" over the arrangement "B" of bands or threads.

The tire sheath "A" may be composed wholly of an arrangement or fabric "B" of bands or fibers "b." In all cases however, I use a tread or shoe "D" of rubber or other suitable material which may be cemented over the bands "b." I prefer also to use an inner lining "C" of canvas or other suitable material as a backing for the arrangement of bands and to protect the inner core "E" from being injured by the bands, which in some cases, especially when a fine hard thread is used, might cut or wear the inner core.

The tire sheath "A" is designed to have an inner circumference which contracts or becomes smaller, the tire thereby tightening itself upon and securing itself firmly to the rim of the wheel.

By the term inner circumference of the tire sheath in this specification, I mean that part of the tire sheath which bears on the rim, the part nearest to or facing toward the axis of the wheel which is the center of such inner circumference. When I refer to the inner circumference as contracting I mean that it approaches the axis of the wheel forming a smaller concentric circle.

By the outer circumference of the tire sheath I mean the circumference at or toward the tread of the tire sheath, which outer circumference enlarges radially when the tire sheath is filled out or distended as by the inner inflatable core "E."

The inner circumference of the tire sheath may be made to contract and tighten upon the rim by means of bands or ligaments "b" which may be of thread, cord, wire or string of any non-elastic suitable material running along the tire longitudinally or circumferentially in such a manner that when the tire fills out or distends as by inflation, the bands or ligaments contract or tighten the inner circumference of the tire sheath down upon the wheel rim.

The tire sheath may be circumferentially slit or open toward the axis of the wheel and, if so slit or open as in Figs. 1 and 2 the edges "a" "a" of the tire sheath (which in such case form its inner circumference) may be made to contract and have a smaller inner circumference by arranging or winding a band or ligament along the tire sheath longitudinally or circumferentially, crossing the tire at regular intervals from edge to edge in an oblique or slanting direction one or more times while winding it once along the circumference of the tire sheath. The winding of the band upon the tire sheath should be done uniformly, crossing over the tire sheath from edge to edge at equal distances, so that the tire may tighten evenly upon the rim. A simple method of thus arranging the bands is to wind the band "b" upon a circular revolving form as shown in Fig. 4 of the proper size to suit the size of the tire desired. If an inner lining is to be used it may be fitted upon the form and the band wound upon it. If no inner lining is used the band may be wound upon the bare form and the outer covering "D" cemented or vulcanized over the arrangement "B" of such band or bands when the winding is complete. The form may have, as shown in Fig. 4, near each edge of its periphery a groove "j" along which the band may run when it is at the outer edge of the form. The periphery of the form may be raised toward the middle line k—k as shown in Fig. 4 so that the tire may more readily assume a tubular form when placed upon the rim of a wheel. The band may then be wound around so as to cross the middle line k—k of the form, one or more times in each revolution. For example, if I desire to have the band cross the form twice in each revolution I may start the band at any given point in the middle line k—k of the form and slant the band across the form into one groove, then along such groove, then crossing the form once to the opposite groove through a point in the middle line k—k midway between the point of commencement and the point where it next reaches the middle line of the form, and after running it along the last mentioned groove slant it back to the middle line of the form not at the point of commencement, as in such case the successive lines or circles of the band would be wound one on the other, but at just such a distance from the point of commencement as it is desired that the successive circles of the band should be distant from each other measured along the said middle line k—k of the form.

The band is then wound around the form uniformly, the successive circles of the band being at equal distances apart and the band crossing the middle line k—k of the form at equal distances until the whole surface of the tire is evenly covered as shown, for example, in Fig. 4 below the line p—p with a succession of bands crossing each other. When the winding is complete the ends of the band must be tied or otherwise secured. The band "b" thus wound forms an arrangement or fabric "B" of fibers or bands and if used with a body or lining of canvas or other suitable material or, if plaited or otherwise made selfconsistent, such fabric may constitute the entire tire sheath. The distance apart of the successive circles of the band may be varied according to the strength of the material used to form the band and according to the strength of tire required. For the tire of a bicycle wheel I ordinarily use a coarse thread such as carpet sewing thread No. 18 for such band and wind it with its successive circles about three-sixteenths of an inch apart, which makes a strong light tire. If additional strength of tire is required the winding may be continued until the surface is again evenly covered.

The band may be made to cross the tire or form one or more times in each revolution, and regularity is obtained in all cases by crossing the middle line k—k at successive points equally distant from each other. The band may be cemented or attached by other suitable means to the inner lining "C" and the outer cover or tread of rubber "D" cemented or vulcanized over the bands which are thus bedded between the rubber tread "D" and the lining "C." At each edge each series or collection "B'" of bands or threads may be inclosed in a loop or recess running around each edge of the tire sheath. These recesses may be easily formed by folding in the edges "c" "c" of the lining "C" over the series of bands or threads B' B' collected in the grooves of the form, as shown in Fig. 1.

To make a tire sheath to fit a wheel rim of a given size, the circumference of the periphery of the form shown in Fig. 4 at the bottom of the grooves "j" "j" should be the same as, or very slightly greater than, the circumference of the bearing surface of the rim on which the edges of the tire sheath are to tighten. As the periphery of the form is raised in the middle, when removed from the form, the bands at the edges, B' B', will slacken so that the tire sheath may be readily placed on the wheel rim.

The rim of the form should be made adjustable in order that the arrangement of bands may be removed therefrom. This may readily be accomplished by making the rim of the form in sections, one of which can be removed when desired.

Instead of folding in the edges of the lining "C" such edges "c" "c" may be extended to meet or, as shown in Fig. 6, overlap one another on the rim, thus protecting the inner tube. Such overlapping edges may be cemented or otherwise attached forming the tire sheath into a complete tube.

The contracting of the inner circumference of the tire sheath "A" may be easily understood by a reference to Fig. 3 in which the band is shown as circling along and around the circumference of the tire a few times with its successive circles far apart to more readily show the way in which the band is wound or arranged. The band in Fig. 3 is arranged in exactly the same manner as if wound upon a form as above described, (see Fig. 4) being wound along the circumference from edge to edge, running from a point in the middle of the tire sheath, being a point in the radially enlarging circumference of the tire at the point "$b'$" in the band, slanting along the circumference of the inner lining, crossing the middle line of the tread consecutively at the points $b^3$ $b^5$ $b^7$ $b^9$ $b^{11}$ $b^{13}$ $b^{15}$ $b^{17}$, the distances between such consecutive points of crossing being equal as above specified.

When the tire sheath is filled out or distended as by inflation the outer circumference of the tire sheath enlarges or describes a larger concentric circle and the distances between the consecutive points $b'$ $b^3$ $b^5$ $b^7$ $b^9$ $b^{11}$ $b^{13}$ $b^{15}$ $b^{17}$ become greater, tightening the connecting band, the tension between each two consecutive points thus drawing, when each edge "$c$" of the lining "C" is folded in over the circles of the band as above specified, a portion of the inner circumference or edge of the tire sheath inward toward the axis of the wheel. For example, the points $b^2$ $b^4$ $b^6$ $b^8$ $b^{10}$ $b^{12}$ $b^{14}$ $b^{16}$, which are consecutive points in the band "$b$" at the inner circumference of the tire midway between the consecutive points $b'$ $b^3$ $b^5$ $b^7$ $b^9$ $b^{11}$ $b^{13}$ $b^{15}$ $b^{17}$ ($b^2$ being midway between $b'$ and $b^3$, and so on) tend in a very marked manner to approach the center as the consecutive points $b'$ $b^3$ $b^5$ $b^7$ $b^9$ $b^{11}$ $b^{13}$ $b^{15}$ $b^{17}$ become farther apart, as shown by arrows pointing in the direction of the force.

It will readily be seen that if a band is wound or arranged along the circumference of the tire with successive circles at short distances apart and continued until the whole surface of the tire is evenly covered, as above specified, when the tire sheath is inflated the inner circumference (—i. e. in the circumferentially rifted tire sheath, as shown in Fig. 2, the edges "$a$" "$a$"—) will contract evenly and form a smaller concentric circle. It will also be seen that any two of such consecutive points in the outer circumference, as $b'$ and $b^3$ must be so far apart that a straight line drawn, as on a side elevational view such as Fig. 3, from one to the other will intersect the circle formed by a line drawn round the inner circumference. I prefer to make the band cross the form or tire sheath not more than three times. The band may be wound upon the form by hand or with proper machinery.

An automatic guide or feeder for the thread such as is used in winders, i. e., winding machines for spooling thread or for winding cotton, yarn or thread on spools, bobbins, &c., may be connected with the revolving form. If a winder is used, the feeder for the thread should have, instead of a continuous lateral motion, an intermittent lateral motion, that is, the feeder or guide should pause for a longer or shorter period of time (according to the number of times the thread is desired to cross the form in each revolution) opposite each groove of the form and at regular intervals should have a lateral motion to lead the thread across the form. The winding machine maker will readily accomplish this by means of a suitably shaped cam. By feeding the form at a number of different points simultaneously a plaited fabric will be made. To so plait the fabric I divide the form into an odd number of equal spaces, say twenty-five. I start a thread simultaneously at each of the said points or spaces in the middle line $k-k$ of the form and wind (with a feeder for each thread) in the same manner as has been above described but crossing the form an odd number of times in each revolution, say three times. The winding is then continued until the form between the grooves is evenly covered. In Fig. 5 a few bands are shown as so plaited, the interstices being larger to more clearly show the arrangement of the threads. The ends of each thread must be tied or otherwise secured. Such a plaited fabric may constitute the entire tire sheath although I prefer, as above mentioned, in all cases to use an outer tread of rubber and an inner lining of canvas. Such a fabric of bands may of course be plaited by hand in length and not endless; then made into an endless circular tire sheath by tying the ends of each thread together.

I do not strictly limit myself to the form or materials any more than to the details of construction mentioned in the foregoing description.

The points where the threads are the greatest distance from the center of the wheel or circle formed by the tire when extended, as shown the points where the threads cross the outer circumference of the tire in Fig. 3, and the angular points where the threads are secured to the tire in Fig. 7, I shall term the apices, and it will be particularly observed that the threads in passing from one apex to the next are deflected outward following the curve of the inner circumference of the tire for a greater or less distance. Thus when the apices are moved outward by the inflation of the tire or otherwise the tendency of the threads to straighten between the apices will draw the inner circumference of the tire inward throughout all of that portion where the thread is deflected or curved outwardly along said inner circumference.

It will readily be seen that the tightening of the bands or threads along the rim is dependent on their being connected with the radially enlarging outer circumference which, as it enlarges radially, draws and tightens the bands. It is therefore not absolutely necessary, but only convenient, that the bands should be arranged as above described, crossing the tire sheath from edge to edge. If the bands or threads are connected with the enlarging outer circumference in any suitable manner so as to be tightened thereby firmly around the rim it is sufficient. One very simple way is to make the band into a number of endless loops or separate endless bands of equal size and to attach such endless bands to the tire sheath, preferably to the inner lining "C," as shown in Fig. 7, each at a point in the outer circumference at or toward the tread. Such points of attachment should be equally distant from the middle line of the tread of the tire sheath and therefore, when the tire sheath is distended or inflated on a wheel rim, equally distant from the axis of the wheel, such points of attachment should also be equally distant from each other along the circumference of the tire sheath. For example, if three hundred and sixty endless bands (and I preferably use a great number of such bands) are to be attached to each side of the tire sheath, the three hundred and sixty points of attachment will be points in a circle dividing a circumferential line drawn through such points into three hundred and sixty equal parts or sections. Each band may be attached to the tire sheath at more points than one. If attached at more points than one the distances between the consecutive points at which each band is attached should be equal and the length of the several portions of the band between each two consecutive points at which each band is attached should be the same. If each band is attached to the tire sheath at two points, such points are at a distance apart of one half of the circumference of the tire; if attached at three points, at a distance apart of one third of such circumference. The number of times each band is attached should be limited as the number of times the band when wound should cross the form or tire sheath is limited as above specified. The tension of the band between each two of such consecutive points should bear down upon the wheel rim. These endless bands should be of a diameter just so much greater than the diameter of the wheel rim that when attached to the outer circumference, such bands, except at and near where so attached, may tighten firmly around the rim, on the enlarging radially from the axis of the wheel of the outer circumference when distended by the inflation of the inner core "E." The endless bands may be attached to the tire sheath "A" by stitching the same to the inner lining "C" at the desired points of attachment. Of course a corresponding number of endless bands must in the same manner be attached to the other side of the lining "C."

It is not absolutely necessary that the bands should be of exactly the same size and attached to the tire sheath at points equally distant from the axis of the wheel and equally distant in succession from each other, but I prefer to make and arrange them thus that the bands may tighten evenly. Evenness of tightening can be most readily secured in this way.

The endless bands at each edge of the lining "C" may be gathered and inclosed by folding in the edges "c" "c" of the lining "C" over the bands and the rubber cover "D" may be cemented or vulcanized to the inner lining "C," or the edges c c of the lining may be extended toward the middle of the rim and overlap one another as shown in Fig. 6. If the tire sheath is shaped around the core "E" and such overlapping edges "c" "c" cemented or otherwise secured together before placing the tire sheath on the rim, the tire sheath will be a complete tube and if made air-tight may be used without an inner inflated core "E." I prefer, however, not to so attach or cement together the edges c c, but to place the core "E" on the wheel rim, shape the tire sheath around it and then inflate the core "E." A suitable air pump and valve are of course used. The inflated tire is thus automatically secured to the wheel rim.

From the foregoing description it will be seen that the self-fixing action of my improved tire does not depend on the particular form of rim used. I prefer a rim with upturned edges (as in Fig. 2) which will assist in keeping the tire in place upon the rim. If a circumferentially rifted tire is used the upturned edges of the rim will keep the collections of bands B' B' from spreading off the rim. For a tire such as is shown in Fig. 6 with a tire sheath, the overlapping edges of which being secured together, are prevented from spreading off the rim, a rim such as is shown in Fig. 6 may be used although I prefer that shown in Fig. 2.

Having now described and ascertained the nature of my said invention and in what manner the same is to be performed, I declare that what I claim is—

1. The herein described vehicle tire embodying a flexible and inflatable sheath and threads extending from points on the sheath remote from the inner circumference of the tire to and along said inner circumference and to another point remote from the inner circumference of the tire, the said threads being deflected outward from a straight line between said remote points, to conform to the inner circumference of the tire; substantially as described.

2. In a vehicle tire, the combination with a flexible and inflatable sheath, of threads passed about the same from outer apices to the inner circumference of the tire at points between the apices, the threads at such intermediate points being deflected outward from straight lines between the apices and extended along the inner circumference of the tire, substantially as described.

3. In a vehicle, tire, the combination with a flexible and inflatable sheath, of threads extending between apices on the outer circumference of the same, the portions of the threads between the apices being deflected outward from straight lines between said apices and passed along the inner circumference of the tire, substantially as described.

4. In a vehicle tire, the combination with a flexible and inflatable sheath, of threads crossing the outer circumference of the same forming apices, the portions of the threads between the apices being deflected outward from straight lines between said apices and passed along the inner circumference of the tire; substantially as described.

5. In a vehicle tire, the combination with a flexible and inflatable inner sheath and a flexible outer sheath, of threads between said sheaths extending between apices at or near the outer circumference of the tire, the intermediate portions, of the threads being deflected outward from straight lines between said apices and passed along the inner circumference of the tire; substantially as described.

6. In a vehicle tire, the combination with a flexible and inflatable inner sheath and a flexible outer sheath, of threads between said sheaths crossing the outer circumference of the inner sheath forming apices, the portions of the threads between the apices being deflected outward from straight lines and passed along the inner circumference of the tire; substantially as described.

7. In a vehicle tire, the combination with the flexible sheath formed with edges at the inner circumference, of threads secured along said edges and at intervals passed out and secured to the tire at points remote from said edges; substantially as described.

8. In a vehicle tire, the combination with the flexible sheath formed with edges at the inner circumference, of threads secured along said edges and crossed over said sheath from one edge to the other at intervals, said crossing points being sufficiently removed from each other to allow the threads to extend around the curve of the inner circumference of the tire for a greater or less distance; substantially as described.

9. In a vehicle tire, the combination with the flexible sheath formed with edges at the inner circumference, of threads secured along said edges and crossed diagonally from one edge to the other at intervals, the threads partaking of the curvature of the inner circumference of the tire along said edges, and an outer sheath incorporated with the threads substantially as described.

10. In a vehicle tire, the combination with the inner fabric sheath having its edges turned out, of the threads passed along in the folds of said edges and crossed from one edge to the other over the sheath at intervals, and the outer sheath or tread inclosing the threads and inner sheath; substantially as described.

In testimony whereof I have hereunto set my hand, in the presence of two witnesses, at Toronto, Canada, this 19th day of December, 1893.

H. J. LA FORCE.

Witnesses:
SYDNEY WALTER WINDELER,
WILLIAM MOFFATT CRAM.